United States Patent [19]
Grafchev et al.

[11] Patent Number: 5,992,017
[45] Date of Patent: Nov. 30, 1999

[54] METHOD AND TOOL FOR THE MANUFACTURE OF A BUILT-UP CAMSHAFT

[76] Inventors: Alexei Petrovich Grafchev, ulitsa Strokina, 19,kv.44; Mikhail Fedorovich Shiryaev, prospekt Busygina, 50,kv.216; Elena Pavlovna Sekretoya, ulitsa Permyakova, 24, kv.110; Evgeny Petrovich Tsiberev, ulitsa Komsomolskaya, 11,kv.25; Georgy Vladimirovich Linetsky, ulitsa Komsomolskaya, 11, kv.11; Adolf Veniaminovich Skoblo, ulitsa B. Pokrovskaya, 58, kv.48, all of Nizhny Novgorod, Russian Federation

[21] Appl. No.: 08/860,236

[22] PCT Filed: Jun. 5, 1995

[86] PCT No.: PCT/RU95/00118

§ 371 Date: Aug. 18, 1997

§ 102(e) Date: Aug. 18, 1997

[87] PCT Pub. No.: WO96/19685

PCT Pub. Date: Jun. 27, 1996

[30] Foreign Application Priority Data

Dec. 20, 1994 [RU] Russian Federation ............. 94044772

[51] Int. Cl.$^6$ ........................................... B23P 15/00
[52] U.S. Cl. .......................................... 29/888.1; 29/283.5
[58] Field of Search .................................. 29/888.1, 523, 29/283.5; 74/567; 123/90.6

[56] References Cited

U.S. PATENT DOCUMENTS

| 4,597,365 | 7/1986 | Madaffer ................................. 123/90.6 |
|---|---|---|
| 4,809,562 | 3/1989 | Bendoraitas et al. .................. 29/888.1 |
| 4,847,963 | 7/1989 | Bendoraitas et al. .................. 29/888.1 |
| 4,858,295 | 8/1989 | Hartnett et al. ......................... 29/888.1 |
| 4,882,825 | 11/1989 | Nakamura ............................... 29/888.1 |
| 4,922,785 | 5/1990 | Arnold et al. ............................. 74/567 |
| 5,253,546 | 10/1993 | Elrod et al. ............................. 29/888.1 |
| 5,280,672 | 1/1994 | Hochstein ............................... 29/888.1 |
| 5,375,323 | 12/1994 | Sata ........................................ 29/888.1 |
| 5,392,511 | 2/1995 | Copeland et al. ....................... 29/888.1 |
| 5,469,759 | 11/1995 | Orsini, Jr. ............................... 29/888.1 |
| 5,727,303 | 3/1998 | Ridenour .................................. 29/523 |

FOREIGN PATENT DOCUMENTS

| 3431361 | 3/1986 | Germany . |
|---|---|---|
| 3701166A1 | 7/1987 | Germany . |
| 3833326A1 | 4/1989 | Germany . |
| 0140722 | 6/1987 | Japan . |
| 2121908 | 1/1984 | United Kingdom . |
| 2210301 | 6/1989 | United Kingdom . |

*Primary Examiner*—I. Cuda
*Attorney, Agent, or Firm*—Gary M. Nath; Nath & Associates

[57] ABSTRACT

A built-up camshaft having a carrying tube and working members is manufactured by attaching the carrying tube to the working members using a tool. The working members have a mounting opening where a plurality of longitudinal "V" shaped splines are located. The working members are placed on the tube and the tube is expanded mechanically using a tool by applying pressure from the inside until the splines of the working members are pressed into the body of the tube. The tube is expanded by the tool so as to form at least three oval-shaped protrusions on the outer surface of the tube. The protrusions are uniformly distributed around the circumference of the tube and are at least wide enough to engage two adjacent splines.

6 Claims, 1 Drawing Sheet

METHOD AND TOOL FOR THE MANUFACTURE OF A BUILT-UP CAMSHAFT

FIELD OF THE INVENTION

The invention relates to engine-building and more particularly, it concerns a method and tool for the manufacture of a built-up camshaft, predominantly for internal combustion engines.

BACKGROUND OF THE INVENTION

A method is known in prior art to be used for the manufacture of a built-in camshaft formed of a carrying tube and at least two working members consisting of longitudinal slots of rectangular cross section which are formed on the surface of a mounting opening of each working member (GB, A, 2210301). Then the working members (cams, bearing journals, eccentrics) are put on the tube in a predetermined sequence so that they are positioned at a required angular position, whereupon a mechanical expansion of the tube is carried out by applying a force thereto from the inside. In so doing, the outer diameter of the tube becomes larger than the diameter of the mounting opening in the working members, and portions of the tube fill up slots provided in the surface of the mounting openings. The expansion of the tube in the method of prior art knowledge is carried out by means of a tool shaped as a rod of circular cross-section with longitudinal projections on its outer surface. The number and section of the projections are therewith identical to the number and section of recesses in the mounting surface of the working members.

The method of prior art knowledge requires high precision in machining the mounting openings of the working members and essentially individual manufacturing of each component. Since the working members are set in a predetermined angular position on the tube, the arrangement of the slots in each working member and tube must exactly correspond to the arrangement of the projections of the tool. This need for high precision leads to a reduction in the productivity of assembly.

In addition to this, a method is also known in prior art to be used for the manufacture of a built-in camshaft (GB, A, 1117816), consisting a plurality of splines having essentially a triangular section and becoming narrower toward the vertex formed in the surface of mounting openings of each working member. The working members are placed on a tube in a predetermined angular and linear position and then the tube is expanded mechanically by applying a force from the inside of the tube until the splines are pressed into the body of the tube with their pointed vertices so that a permanent connection is thus formed between the working members and the tube. In this method of prior art knowledge, the expansion of the tube is carried out over the entire circumference of the tube using a tool. The tool consists of a rod and a working head attached at its end coaxially and defined by two conical surfaces. The bases of the two conical surfaces facing one another and having a cylindrical calibrating shoulder between them, which has a diameter corresponding to the inner diameter of the tube after its expansion. In order to ensure a guaranteed pressing-in of the pointed splines into the body of the tube over entire circumference, it is necessary to pull the tool through the tube with a high force, for instance, for tubes of 22 mm in diameter the pulling-through force is to be as high as about 18 tf. This puts a limitation on the selection of a material for the working member. The selected material must have an adequate ductility in order to avoid a failure of the working member in the process of pulling the tool through. At the same time, as a rule, more ductile materials, for instance steel, are hard to use and are not easily pressed. Therefore, in order to ensure the required precision of the products, a further finishing of the material by means of mechanical treatment is necessary which leads to a reduction in productivity and to an increase in the cost of production.

SUMMARY OF THE INVENTION

The problem put in the basis of the invention is to develop a method for the manufacture of a built-up camshaft, wherein the expansion of the tube would be carried out in such a way which ensures a reliable permanent connection of the tube with a working member, but without requiring that a force be applied to the tube capable of causing a destruction of rather brittle material (for instance, powdered materials) and which is also applicable in mass production so that high productivity is ensured. A tool for carrying out such a method is also disclosed.

The problem thus posed is solved in a method for the manufacture of a built-up camshaft for internal combustion engines, wherein said camshaft consists of a carrying tube and at least two working members attached thereto by means of, first, forming a plurality of longitudinal splines becoming narrower toward the vertex in the surface of a mounting opening of each working member, placing each working member on the tube in a predetermined angular and linear position, followed by a mechanical expansion of the tube by applying a force thereto from the inside until the splines of the working members get pressed into the body of the tube so that a permanent connection is thus formed between the tube and the working members. According to the invention, the tube is expanded so as to form on its outer surface at least three oval-shaped protrusions uniformly distributed around the circumference and each protrusion having a width at least two times as large as the distance between the vertices of two adjacent splines on the surface of the working members.

Preferably, 6 to 8 longitudinal oval-shaped protrusions are to be formed on the surface of the tube in the process of expanding. It is advisable, in order to reduce the force exerted to the tube, to carry out the expansion of the tube in two stages. First, the longitudinal protrusions are formed on the outer surface of the tube so that the protrusions have a width ranging from 0.5 to 0.95 of the protrusions' predetermined width. Second, the width and height of the protrusions on the surface of the tube are brought to their predetermined values so that the working members are pressed into the body of the protrusions formed on the surface of the tube and, having at least two projections of each working member interact with each protrusion of the tube.

The problem thus posed is also solved with a tool for expanding a tube in the process of building up a camshaft, wherein said tool compromising a rod and a working head coaxially attached thereto and defined by two tapered portions facing one another and having a cylindrical calibrating shoulder which has the diameter exceeding the inner diameter of the tube, said shoulder being disposed between the tapered portions, and wherein the head is provided with at least three longitudinal slots uniformly distributed around the circumference and separated from each other by projections.

In order to expand the tube in a more streamlined fashion, the tool may be provided with a further working head similar to the main one and attached to the rod in front of the main working head in the direction the tool will travel, wherein the projections of the further working head are arranged in to be disposed in the same direction with the projections of the main working head and the further working head width ranges from 0.5 to 0.95 of the width of the projections of the main working head.

It is advisable to make both the main and the further working heads have 6 to 8 projections.

The method for the manufacture of a built-up camshaft, when carried out in accordance with the preset invention, requires substantially smaller forces to be applied for ensuring a reliable connection of the working members with the tube than in the case of expanding the tube over the entire circumference thereof.

The mutual penetration of the splines in the openings of the working members and the protrusions of the tube ensures resistance to higher torques than that when the surface of the tube is smooth. It is also noted that no special orientation of the shaped working members on the tube is required. This guarantees reliability of the connection and substantially simplifies the disclosed method for the manufacture of built-up camshafts as well as widens up the potentialities of this method and allows the use of conventional tubes instead of high precision.

The tool for carrying out this method, according to the invention, is simple to manufacture and is reliable.

BRIEF DESCRIPTION OF THE DRAWINGS

Hereinafter, the invention is illustratively described with reference to the accompanying drawings.

DETAILED DESCRIPTION

Figure 1:
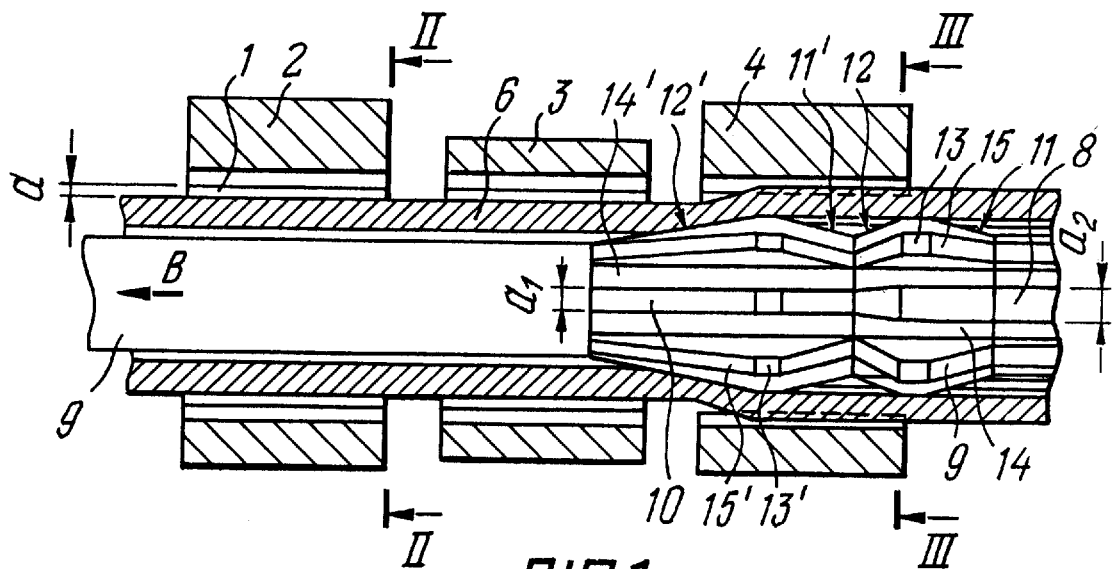
FIG. 1 is a sectional view of the built-up camshaft used in the method according to the invention, and the tool for carrying out this method.
Figure 2:
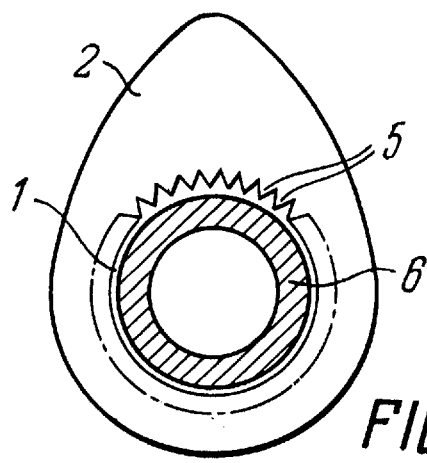
FIG. 2 is a sectional view taken along the line II—II in FIG. 1.
Figure 3:
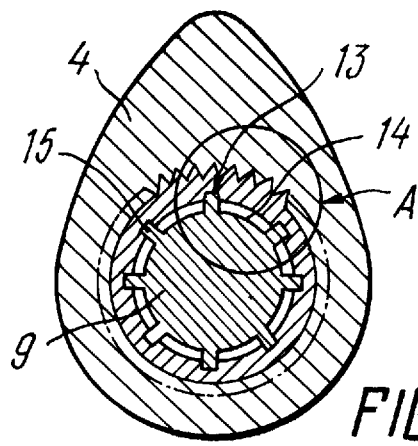
FIG. 3 is a sectional view taken along the line III—III in FIG. 1.
Figure 4:
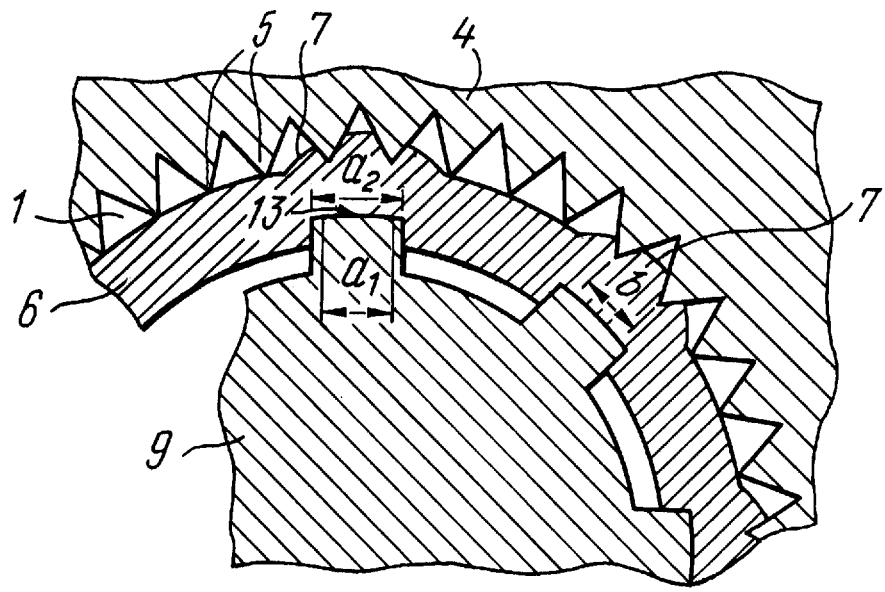
FIG. 4 is the area A in FIG. 3, shown in an enlarged view.

A method for the manufacture of a built-up camshaft, predominately for internal combustion engines, according to the invention, consists of first forming in the surface of a mounting opening 1 (FIGS. 1 to 4) of each working member 2, 3, 4 of the manufactured camshaft a plurality of longitudinal splines 5 (of an essentially triangular section) which become narrower toward the vertices. The working members with mounting openings having such a shape can be made in mass production, for instance, by a method of powder metallurgy. After this, the working members 2 to 4 (in the example described here, three working members are shown, but there can be, however, also more of them) are arranged on a tube 6 in a predetermined angular and linear position. Incidentally, the tube 6 has an outer diameter which is smaller than the diameter of the mounting openings 1 of the working members 2 to 4 by as much as 2*d*, where d is a mounting clearance. Then a mechanical expansion of the tube 6 is carried out by applying a force to the tube from the inside so that the resulting pressure is sufficient to ensure pressing the pointed splines 5 into the body of the tube 6. According to the invention, the tube is expanded so as to form on its outer surface at least three and preferably, 6 to 8 oval-shaped protrusions 7 each of which has a width at least two times as large as the distance "b" between the vertices of two adjacent splines 5 of the mounting opening 1. In order to reduce the force of pressure on the tube 6, the process of expanding it is carried out in two stage. First, the longitudinal protrusions are formed on the outer side of the tube 6 so that the width of the protrusions ranges from 0.5 to 0.95 of the predetermined value, and second the width and height of the protrusions 7 are brought to their predetermined values so that at least two projections of each working member 2 to 4 are pressed into each protrusion 7 of the tube.

Tube 6 is expanded using a shape-forming member comprising a rod 8 at the end of which and coaxially thereto are attached two working heads 9, 10, a main one and a further one, respectively.

Incidentally, the further head 10 is arranged to be disposed in front of the main head 9 as seen in the direction the tool travels (shown in FIG. 1 by an arrow B). The heads 9 and 10 are defined each by two tapered portions 11, 12 and 11', 12' so that the bases of each conical surface face one another and having a cylindrical portion of a cylindrical calibrating shoulder 13, 13', respectively, arranged to be disposed between the bases. Each head 9, 10 is provided with longitudinal slots 14, 14' uniformly distributed around the surface of the tool and separated from each other by projections 15, 15', respectively, which are therewith formed. Incidentally, the projections 15' of the further head 10 are arranged to be disposed in the same direction as the projections 15 of the main head 9 and their width $a_1$ ranges from 0.5 to 0.95 of the width $a_2$ of the projections 15 of the main head 9. The number of the projections 15 (15') may be three or more, preferably 6 to 8. In the example described herein, the tool is shown to have eight projections 15 (15'). The diameter of the calibrating shoulder 13 (13') is larger than the initial value of the inner diameter of the tube 6 and corresponds to the value of the inner diameter of the tube 6 after its expansion, and it is such that penetration of the splines is embedded by not less than 0.2 of their height, whereas the width of the slots 14 (14') of the tool is selected, based on the width of the projections 15 (15') of at least 2*b*, where b is the distance between the vertices of two adjacent splines 5.

While the tool is pulled through the bore of the tube 6, the mounting clearance d is taken up by the further head 10. Eight longitudinal oval-shaped protrusions (shown in FIG. 4 by a dashed line) are formed on the surface of the tube 6, and then, the protrusions 7 are brought to a predetermined height defined by the main head 9 so that at least two splines 5 of the working members 2 to 4 are cut into the body of the tube 6 per each protrusion 7. The areas of the tube 6 disposed opposite the slots 14 (14') between the projections 15 (15') of the shape-forming tool will change less, reducing stress in the working members 2 to 4 caused by variations in the magnitude of the mounting clearance d.

As the tube deforms, the projections 15' having the width $a_1$ penetrate the body of the tube 6 forming grooves therein to suit their shape. As the projections 15 slide along the grooves thus formed, with the width thereof $a_2 > a_1$, the area of contact becomes large due to an increase in the width of the projection 15 causing the deformation. As a result of the deformation, the mounting clearance d gets taken up and the diameter of the tube changes so that oval protrusions 7 are formed with the material of the tube 6. The deformation causes the oval protrusions 7 to be penetrated by the splines 5 of the members 2 to 4. In so doing, the depth of the groove in the tube 6 is at maximum when the outer diameter of the tube 6 is at minimum and the wall thickness of the tube 6 is at maximum (both of these values are within the tolerance limits), and the depth of the groove is at minimum when the tube 6 has the maximum outer diameter and the minimum wall thickness.

In the first case, while the projections 15 are working, their width being equal to $a_2$, the process of penetrating the body of the tube 6 prevails, and the expansion of the outer diameter of tube 6 takes place.

In the second case, the penetration of the projections 15 into the body of the tube 6 is insignificant and the expansion of the outer diameter of tube 6 takes place. Thus, there takes place a compensation for the deviations in the dimensions of the tube within the limits of the tolerance and the mounting clearance so that the wall thickness of the tube after deformation is actually constant.

In order to evaluate the advantages of the method, according to the invention, comparative tests have been carried out, for which we have manufactured five types of the builtup camshaft, ten specimens of each type, by varying the shape of the mounting opening in the working members and the shape of the tool for expanding the tube.

In all the cases, the working members were made of sintered powdered materials and had a mounting opening diameter of 22 mm. Also, in two cases, the openings were made circular and, in three cases, with 36 longitudinal splines of triangular shape having the height h≈0.43 mm. In all the cases, use was made of tubes made of steel Grade 30 (c=0.27 to 0.35%, Cr<0.25%, Mn=0.5 to 0.8% , Si=0.17 to 0.37%, S, pH) having the outer diameter of 21±0.3 mm and the wall thickness of 3±0.3 mm. The tube was expanded by a tool having one working head without projections, by a tool, according to the invention, having only one, main working head with 8 projections, and by a tool having 2 working heads with 8 projections each and with a cylindrical calibrating shoulder having a diameter of 16.4 mm. In cases where the tool had one working head, the projections had the width $a_2$=2.0 mm and the height of 5 mm; in the cases where the tool had two working heads, the width of the projections was $a_1$=1.8 mm for the further head and $a_2$=2.0 mm for the main head.

The test results are given in the Table:

| | | Shape of opening | | | | |
| | | Circular | Circular | Splined | Splined | Splined |
| | | Kind of deforming tool | | | | |
| 1 | Unit of measurement | One working head without projections | 1 head with 8 projections | 1 working head without projections | 1 head with 8 projections | 2 working heads with 8 projections |
| 1 | 2 | 3 | 4 | 5 | 6 | 7 |
| 1. Shearing torque at maximum attainable interference | Nm | 1000–2700 | 1500–3000 | 2000–3800 | 3000–5000 | 5000–7000 |
| 2. Axial shear at maximum attainable interference | kN | 11 | 14 | 17 | 21 | 25 |
| 3. Maximum interference attained without destruction | mm | 0.58 | 0.8 | 0.6 | 1.2 | 1.4 |
| 4. Force at drawing deforming tool | tf | 13–20 | 10–17 | 12–16 | 6–12 | 4–7 |

The results of the tests thus carried out have shown that the disclosed method solves most successfully the posed problem of reliable connection of the working members with the carrying tube during the manufacture of a built-up camshaft.

The method and tool for the manufacture of a built-up camshaft, according to the invention, can find wide application in mass production at automotive-industry and engine-building enterprises.

We claim:

1. A method of manufacturing a built-up camshaft, said camshaft comprising a carrying tube and at least two working members, each of said at least two working members having a mounting opening therein for receiving said tube, said method resulting in the attachment of said working members to said tube and comprising the steps of, forming a plurality of longitudinal splines in a surface of said mounting opening of each working member, said splines having a first end and a second end and becoming narrower toward said second end so as to form vertices, placing each working member on the tube in a predetermined angular and linear position, mechanically expanding the tube by applying pressure from the inside of the tube until the splines of the working members get pressed into the tube so that a permanent connection is thus formed between the tube and the working members, and forming at least three oval-shaped protrusions uniformly distributed around the circumference of the tube by said tube expansion and forming each protrusion to have a width being at least two times as large as the distance between the vertices of two adjacent splines on the surface of the working members.

2. The method according to claim 1, wherein 6 to 8 projections are formed on the surface of said tube.

3. The method according to claim 1, wherein said mechanical expansion of said tube is carried out in two stages, a first stage comprises forming longitudinal protrusions on the outer surface of the tube so that the width of said protrusions ranges from 0.5 to 0.95 of a predetermined value, and a second stage comprises bringing the width and height of said protrusions on the surface of the tube to the predetermined values causing at least two splines of each working member to be pressed into each protrusion of the tube.

4. A tool for expanding a tube in the process of building up a camshaft having a carrying tube and a number of working members mounted on the tube, mounting openings of each of said working members having a plurality of longitudinal splines becoming narrower toward peaks thereof, said splines being uniformly distributed around surfaces of said mounting openings, said tool comprising:

a rod;

a main working head attached coaxially to the rod, said working head being defined by two tapered portions and by a cylindrical calibrating shoulder located between the two tapered portions;

said tapered portions having bases facing one another, said bases having a diameter exceeding an inner diameter of the tube;

at least three longitudinal projections substantially uniformly distributed around the surface of the main working head;

a working surface of the main working head, said working surface being defined by surfaces of the longitudinal projection portions located on the cylindrical calibrating shoulder and engaging an inner surface of the tube to expand the tube so as to form on an outer surface thereof at least three oval-shaped extensions substantially uniformly distributed around the outer surface of said tube, each of said extensions having a width at least two times as large as a distance between said peaks of two adjacent splines on the surface of the mounting openings of the working members, each of said extensions having a height sufficient for providing a permanent connection of the outer surface of the tube with the surfaces of the mounting openings of the working members by means of the splines being passed into the body of the tube.

5. The tool according to claim 4, wherein said head is provided with 6 to 8 projections.

6. The tool according to claim 4, wherein said tool is provided with a further working head similar to the main working head and attached to the rod in front of the main working head, wherein the projections of the further working head are arranged to be disposed in the same direction as the projections of the main working head and wherein a width of the further working head projections ranges from 0.5 to 0.95 of the width of the projections of the main working head.

* * * * *